US009110697B2

(12) United States Patent
Konik et al.

(10) Patent No.: US 9,110,697 B2
(45) Date of Patent: *Aug. 18, 2015

(54) SENDING TASKS BETWEEN VIRTUAL MACHINES BASED ON EXPIRATION TIMES

(71) Applicant: International Business Machines Corporation, Armonk, NY (US)

(72) Inventors: Rafal P. Konik, Oronoco, MN (US);
Roger A. Mittelstadt, Byron, MN (US);
Brian R. Muras, Rochester, MN (US);
Mark W. Theuer, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 181 days.

This patent is subject to a terminal disclaimer.

(21) Appl. No.: 13/797,778

(22) Filed: Mar. 12, 2013

(65) Prior Publication Data

US 2014/0173599 A1 Jun. 19, 2014

Related U.S. Application Data

(63) Continuation of application No. 13/718,122, filed on Dec. 18, 2012.

(51) Int. Cl.
| G06F 9/46 | (2006.01) |
| G06F 9/455 | (2006.01) |
| G06F 9/48 | (2006.01) |
| G06F 9/50 | (2006.01) |

(52) U.S. Cl.
CPC .......... *G06F 9/45533* (2013.01); *G06F 9/4881* (2013.01); *G06F 9/5005* (2013.01)

(58) Field of Classification Search
None
See application file for complete search history.

(56) References Cited

U.S. PATENT DOCUMENTS

| 8,250,574 | B2* | 8/2012 | Baba ................................ 718/1 |
| 8,533,103 | B1* | 9/2013 | Certain et al. .................. 705/37 |
| 2003/0135486 | A1* | 7/2003 | Edlund et al. ..................... 707/3 |
| 2005/0039183 | A1* | 2/2005 | Romero et al. ................ 718/100 |
| 2005/0114860 | A1* | 5/2005 | Lin et al. ........................ 718/100 |
| 2010/0082851 | A1* | 4/2010 | Green et al. .................... 710/29 |
| 2011/0067032 | A1* | 3/2011 | Daly et al. ..................... 718/103 |

* cited by examiner

*Primary Examiner* — Diem Cao
(74) *Attorney, Agent, or Firm* — Owen J. Gamon; Roy W. Truelson

(57) ABSTRACT

In an embodiment, if an estimated time to perform a task by a first virtual machine is less than or equal to an expiration time of the first virtual machine minus the current time, the task is performed by the first virtual machine. If the estimated time to perform the task by the first virtual machine is greater than the expiration time of the first virtual machine minus the current time, a selected virtual machine is selected from among a plurality of virtual machines with a smallest estimated time to perform the task and a request to perform the task is sent to the selected virtual machine.

13 Claims, 5 Drawing Sheets

| VIRTUAL MACHINE DATA (152) ||||||
|---|---|---|---|---|---|
| VIRTUAL MACHINE ID (312) | EXPIRATION TIME (314) | ASSIGNED PROCESSORS (316) | ALLOCATED MEMORY (318) | AUTOMATIC EXTENSION (320) | |
| VM A | 5/1/2012; 10:30:22 | 2.5 | .25 | TRUE | 302 |
| VM B | 6/15/2012; 11:46:00 | 1.5 | 1.25 | FALSE | 304 |
| VM C | 6/16/2012; 01:22:00 | .2 | .25 | FALSE | 306 |
| VM D | 6/14/2012; 02:35:36 | 2.1 | 0 | FALSE | 308 |

FIG. 3

SENDING TASKS BETWEEN VIRTUAL MACHINES BASED ON EXPIRATION TIMES

CROSS-REFERENCE TO RELATED APPLICATIONS

This application is a continuation of U.S. patent application Ser. No. 13/718,122, filed Dec. 18, 2012, entitled "SENDING TASKS BETWEEN VIRTUAL MACHINES BASED ON EXPIRATION TIMES," and incorporated by reference herein in its entirety.

FIELD

An embodiment of the invention generally relates to computer systems and more particularly to computer systems that execute virtual machines that have expiration times.

BACKGROUND

Computer systems typically comprise a combination of computer programs and hardware, such as semiconductors, transistors, chips, circuit boards, storage devices, and processors. The computer programs are stored in the storage devices and are executed by the processors.

Computers are often connected via networks, such as in cloud computing or client/server models, and execute virtual machines. The executions of virtual machines may be started and stopped on computer systems, the virtual machines may be moved between computer systems that belong to a cloud of computer systems, resources within the cloud of computer systems maybe allocated and deallocated to the virtual machines, and tasks, requests, or work units may be sent to virtual machines for processing.

Virtual machines often share physical machine resources. Each virtual machine may run its own operating system (typically called guest operating systems), which may be the same or different from each other. Virtual machines may allow multiple operating system environments to co-exist on the same computer, in isolation from each other. Virtual machines may provide an instruction set architecture that is somewhat different from that of the underlying physical machine or processor.

Some virtual machines are implemented as logical partitions in a logically-partitioned computer. Other virtual machines execute within a single logical partition in a logically-partitioned computer, and a virtual machine may move between logical partitions within the same logically-partitioned computer or different logically partitioned computers. Each logical partition in a logically-partitioned computer may comprise and utilize an OS (operating system), which controls the primary operations of the logical partition in the same manner as the operating system of a non-partitioned computer. Some or all of the operating systems may be the same or different from each other. Any number of logical partitions may be supported, and the number of the logical partitions resident at any time in the computer may change dynamically as partitions are added or removed from the computer. A hypervisor may add, remove, start, and/or shutdown logical partitions and may allocate resources to and deallocate resources from the logical partitions.

Each logical partition may comprise instructions that execute on the processor in a separate, or independent, memory space, and thus each logical partition may act much the same as an independent, non-partitioned computer from the perspective of each application that executes in each such logical partition. As such, the applications typically do not require any special configuration for use in a logical partition environment.

SUMMARY

A computer-readable storage medium and computer are provided. In an embodiment, if an estimated time to perform a task by a first virtual machine is less than or equal to an expiration time of the first virtual machine minus the current time, the task is performed by the first virtual machine. If the estimated time to perform the task by the first virtual machine is greater than the expiration time of the first virtual machine minus the current time, a selected virtual machine is selected from among a plurality of virtual machines with a smallest estimated time to perform the task and a request to perform the task is sent to the selected virtual machine.

BRIEF DESCRIPTION OF THE SEVERAL VIEWS OF THE DRAWINGS

FIG. 3 depicts a block diagram of an example data structure for virtual machine data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
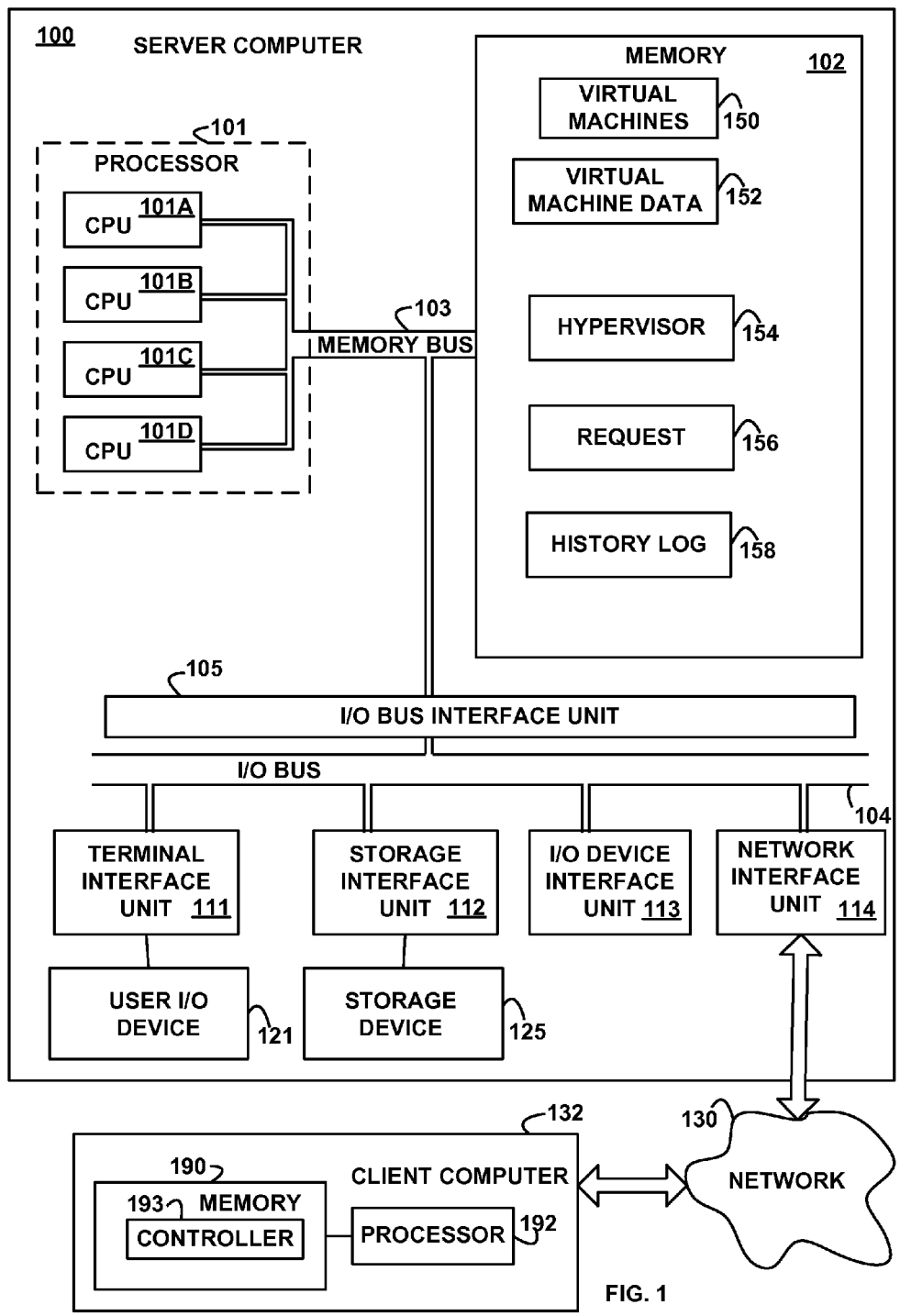
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanism and apparatus of embodiments of the present invention apply equally to any appropriate computing system.

The major components of the server computer system 100 comprise one or more processors 101, a memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes virtual machines 150, virtual machine data 152, a hypervisor 154, a request 156, and a history log 158. Although the virtual machines 150, the virtual machine data 152, the hypervisor 154, the request 156, and the history log 158 are illustrated as being contained within the memory 102 in the server computer system 100, in other embodiments some or all of them may be on different computer systems and may be accessed remotely, e.g., via the network 130. The server computer system 100 may use virtual addressing mechanisms that allow the programs of the server computer system 100 to behave as if they only have access to a large, single storage entity instead of access to multiple, smaller storage entities. Thus, while the virtual machines 150, the virtual machine data 152, the hypervisor 154, the request 156, and the history log 158 are illustrated as being contained within the memory 102, these elements are not necessarily all completely contained in the same storage device at the same time. Further, although the virtual machines 150, the virtual machine data 152, the hypervisor 154, the request 156, and the history log 158 are illustrated as being separate entities, in other embodiments some of them, portions of some of them, or all of them may be packaged together.

In an embodiment, the virtual machines 150 and the hypervisor 154 comprise instructions or statements that execute on the processor 101 or instructions or statements that are interpreted by instructions or statements that execute on the processor 101, to carry out the functions as further described below with reference to FIGS. 2, 3, 4, and 5. In an embodiment, the virtual machines 150 and/or the hypervisor 154 are implemented in hardware via semiconductor devices, chips, field programmable gate arrays, logical gates, circuits, circuit cards, and/or other physical hardware devices in lieu of, or in addition to, a processor-based system. In an embodiment, the virtual machines 150 and/or the hypervisor 154 comprise data in addition to instructions or statements. The history log 158 comprises a saved history of requests previously received, the amounts of various resources that were allocated to the virtual machines that the virtual machines used to perform the previous requests, and the elapsed times taken to perform the previous requests using the allocated resources.

The memory bus 103 provides a data communication path for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they may alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and the client computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the server computer system 100 may be a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the client computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In particular, the client computer system 132 comprises memory 190 connected to a processor 192. The memory 190 stores a controller 193, which executes on the processor 192. The controller 193 may send the request 156 to the server computer 100.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and/or the client computer system 132 and that, when read and executed by one or more processors in the server computer system 100 and/or the client computer system 132 or when interpreted by instructions that are executed by one or more processors, cause the server computer system 100 and/or the client computer system 132 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
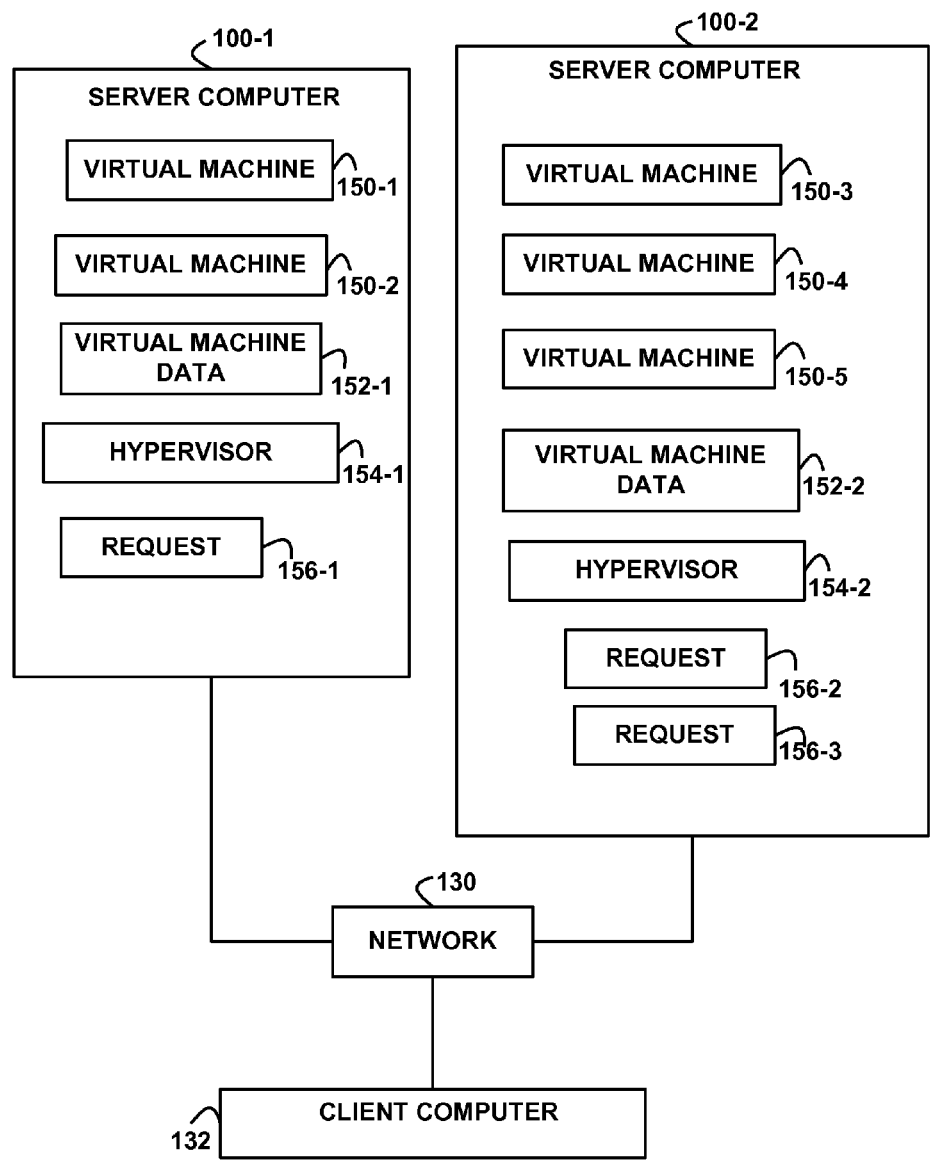
FIG. 2 depicts a block diagram of an example network of computer systems, according to an embodiment of the invention.

FIG. 2 depicts a block diagram of a server computer 100-1, a server computer 100-2, and a client computer 132, connected via a network 130, according to an embodiment of the invention. The server computers 100-1 and 100-2 are examples of, and are generically referred to by, the server computer 100 (FIG. 1). The server computer 100-1 comprises virtual machines 150-1 and 150-2, virtual machine data 152-1, a hypervisor 154-1, and a request 156-1. The server computer 100-2 comprises a virtual machine 150-3, a virtual machine 150-4, a virtual machine 150-5, virtual machine data 152-2, a hypervisor 154-2, a request 156-2, and a request 156-3. The virtual machines 150-1, 150-2, 150-3, 150-4, and 150-5, which may be the same or different from each other, are examples of, and are generically referred to by, the virtual machine 150 (FIG. 1). The virtual machine data 152-1 and 152-2, which may be the same or different from each other, are examples of, and are generically referred to by, the virtual machine data 152 (FIG. 1). The virtual machines 150-1, 150-2, 150-3, 150-4, and 150-5 and the server computers 100-1 and 100-2 may send their respective virtual machine data 152-1 and 152-2 (or entries within the virtual machine data 152-1 and 152-2) to each other and receive the virtual machine data 152-1 and 152-2 (or entries) from each other. The requests 156-1, 156-2, and 156-3, which may be the same or different from each other, are examples of, and are generically referred to by, the request 156 (FIG. 1).

FIG. 3 depicts a block diagram of an example data structure for virtual machine data 152, according to an embodiment of the invention. The virtual machine data 152 comprises any number of entries, such as the example entries 302, 304, 306, and 308, each of which comprises an example virtual machine identifier (ID) field 312, an expiration time field 314, an assigned processors field 316, an allocated memory field 318, and an automatic extension field 320. The virtual machine identifier (ID) field 312, in each entry, uniquely identifies a virtual machine 150. The expiration time field 314, in each entry, specifies a data and/or time at which the virtual machine 150 identified by the virtual machine identifier field 312, in the same entry, is to be shut down, stopped, or have its execution automatically halted by the virtual machine or by the hypervisor 154. In an embodiment, the expiration time 314 prevents long running virtual machines from consuming resources of the server computer system 100, even if the virtual machine has no tasks to perform.

The assigned processors field 316, in each entry, specifies the number of the processors 101 or the amount of processor cycles or time slices of the processors 101 that are allocated to the virtual machine 150 identified by the virtual machine identifier field 312, in the same entry. The allocated memory field 318, in each entry, specifies the amount of the memory 102 that is allocated to the virtual machine 150 identified by the virtual machine identifier field 312, in the same entry. The automatic extension field 320, in each entry, specifies whether or not an automatic extension to the expiration date identified by the expiration time field 314, in the same entry, is allowed. In other embodiments, the virtual machine data 152 may specify amounts of other resources allocated to the virtual machines 150, in addition to, or in lieu of, the processors 101 and the memory 102.

Figure 4:
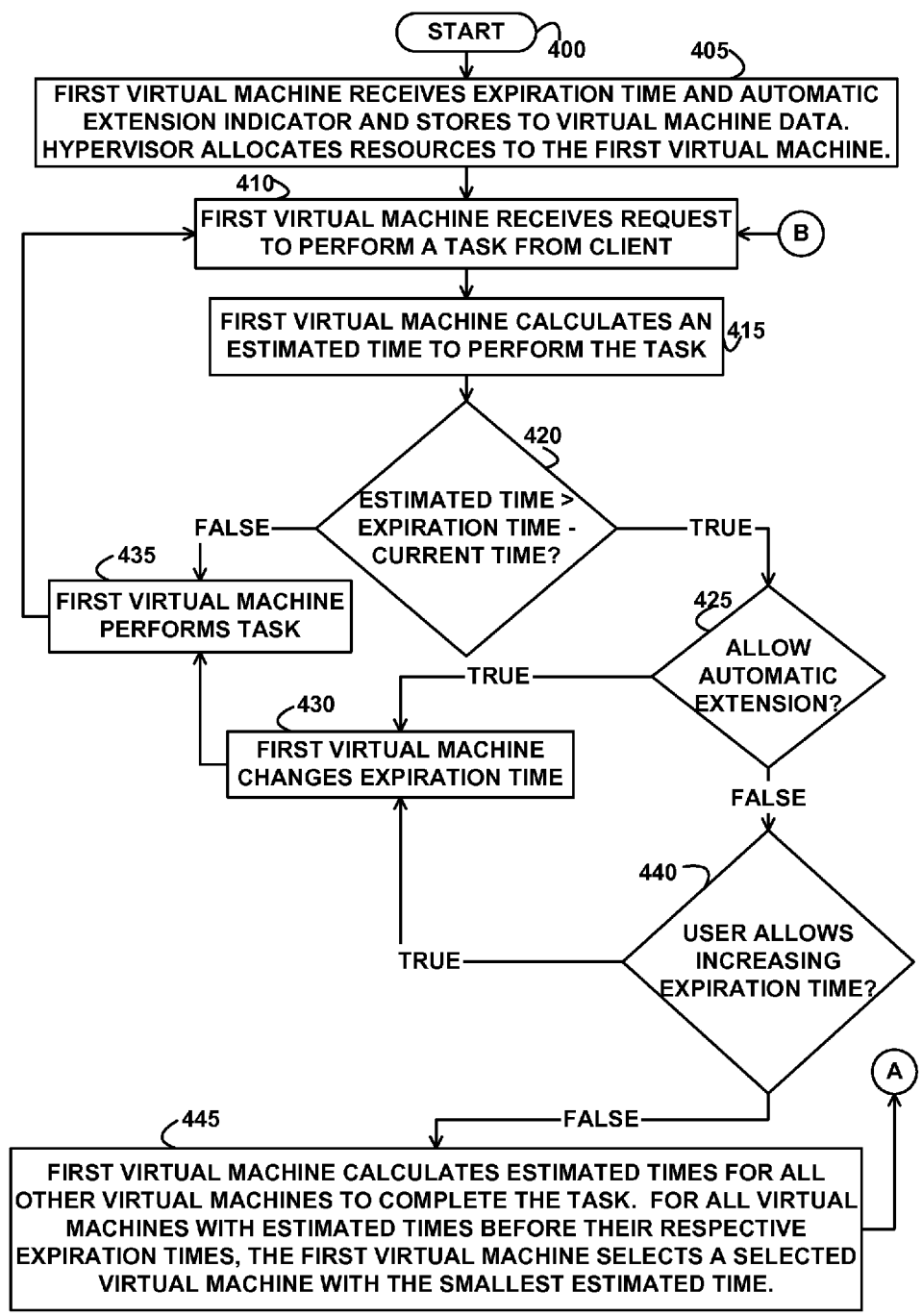
FIG. 4 depicts a flowchart of example processing for scheduling a task to a virtual machine, according to an embodiment of the invention.
Figure 5:
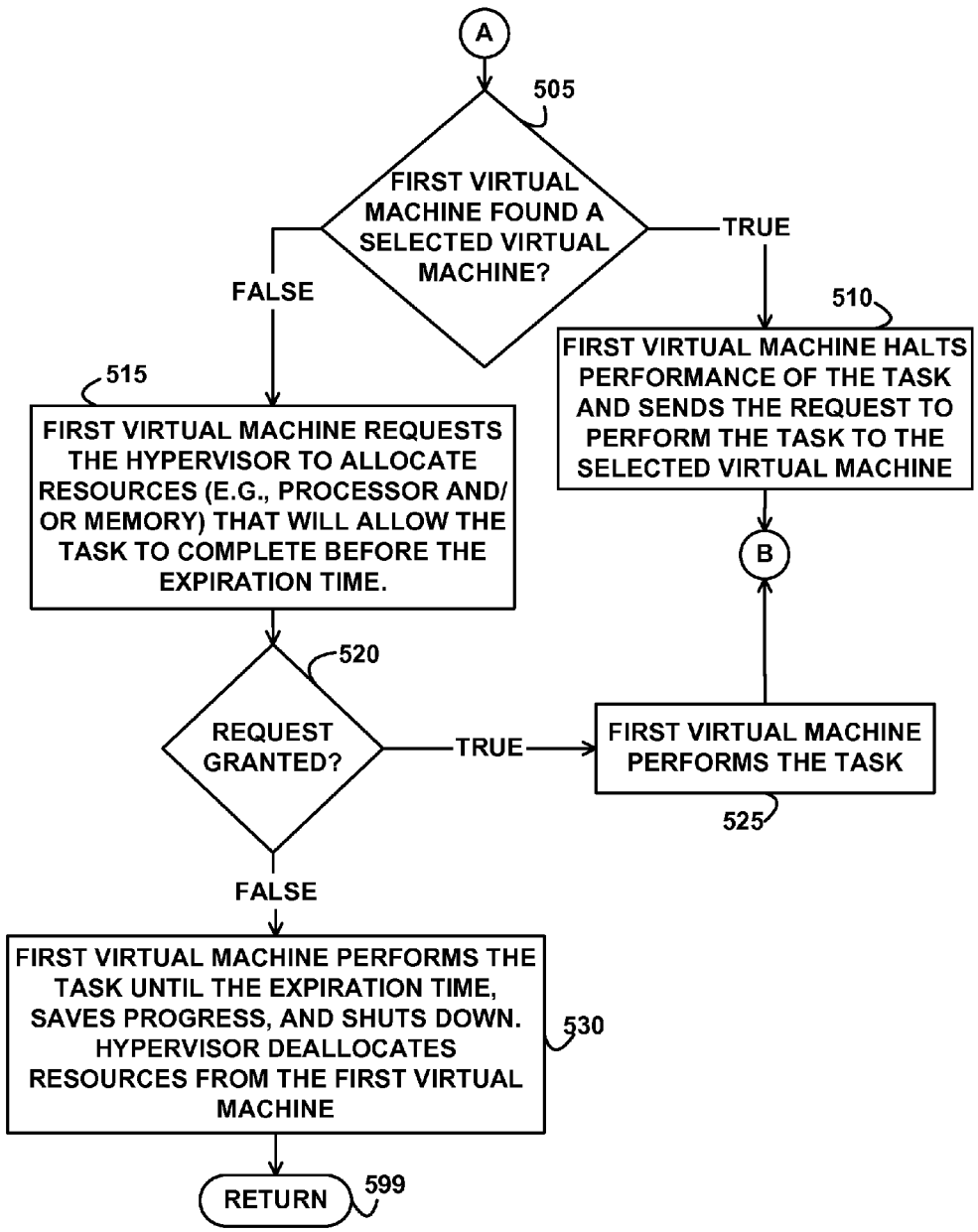
FIG. 5 depicts a flowchart of further example processing for scheduling a task to a virtual machine, according to an embodiment of the invention.

FIGS. 4 and 5 depict flowcharts of example processing for scheduling a task to a virtual machine, according to an embodiment of the invention. The logic of FIGS. 4 and 5 may be executed simultaneously, concurrently, substantially concurrently, or interleaved at any or all of the server computers 100, such as the server computers 100-1 and 100-2, in the same or different threads or processes on the same or different processors for the same or different virtual machines 150 via multi-threading, multi-tasking, multi-processing, or multi-programming techniques. Further, the first virtual machine, as referred to herein, may refer to any or all of the virtual machines 150-1, 150-2, 150-3, 150-4, and 150-5, and may refer to the same or different of the virtual machines in the same or different invocations of the logic of FIGS. 4 and 5.

Control begins at block 400. Control then continues to block 405 where a first virtual machine 150 receives an expiration date and/or time and an automatic extension indicator and stores them to an entry in the virtual machine data 152. The hypervisor 154 allocates resources, such as processors and memory to the first virtual machine 150.

Control then continues to block 410 where the first virtual machine 150 receives a request 156 from a client 132 to perform a task. In various embodiments, the task is a database operation, such as a query, insert, or update operation or a search operation that specifies keywords. In other embodiments, the task is any appropriate work unit or operation. In another embodiment, the first virtual machine 150 may receive the request 156 from another virtual machine 150 or other application.

Control then continues to block 415 where the first virtual machine 150 calculates an estimated time to perform the task, using the resources that are allocated to the first virtual machine 150. In various embodiments the first virtual machine 150 calculates the estimated time to be the same time or an average time used to perform the same task in the past if the resources allocated to the first virtual machine 150 in the past were the same as the resources allocated to the first virtual machine 150 at the current time, using the history log 158. In an embodiment, the first virtual machine 150 adjusts the estimated time from the past actual or average time in proportion to the ratio of the amount of resources allocated at the past times and the current time. For example, if the past assigned processors of the first virtual machine 150 were half as much as the current assigned processors 316 of the first virtual machine 150, then the first virtual machine 150 calculates the estimated time to be has half as long as the past actual time. In another embodiment, for tasks that are database queries, the virtual machine 150 calculates the estimated time to be proportional to the cardinality of the rows in the database tables specified by the queries.

Control then continues to block 420 where the first virtual machine 150 determines whether the estimated time is greater than the expiration time 314 specified in the virtual machine data entry whose virtual machine identifier field 312 matches the identifier of the first virtual machine 150 minus the current time. If the determination at block 420 is true, then the estimated time is greater than the expiration time 314 specified in the virtual machine data entry whose virtual machine identifier field 312 matches the identifier of the first virtual machine 150 minus the current time, so control continues to block 425 where the first virtual machine 150 determines whether to allow an automatic extension of the expiration time 314. In an embodiment, the first virtual machine 150 makes the determination of block 425 by reading the automatic extension field 320 in the entry of the virtual machine data 152 with a virtual machine identifier field 312 that matches the identifier of the first virtual machine 150.

If the determination at block 425 is true, then an automatic extension of the expiration time is allowed, so control continues to block 430 where the first virtual machine 150 changes the expiration time 314 by an adjustment amount to a new expiration time to be sufficiently further in the future, so as to allow the first virtual machine 150 to complete the task before the new expiration time. In an embodiment, the first virtual machine 150 changes the expiration time 314 to be the current time plus the estimated time. Control then continues to block 435 where the first virtual machine 150 performs the requested task. Control then returns to block 410, where the first virtual machine 150 receives the same or a different request 156 from the same or a different client computer 132 to perform the same or a different task, as previously described above.

If the determination at block 425 is false, then an automatic extension of the expiration time is not allowed, so control continues to block 440 where the first virtual machine 150 determines whether the user allows increasing the expiration time. In an embodiment, the first virtual machine 150 makes the determination at block 440 by sending a message to the user via the user I/O device 121, prompting the user as to whether the user wishes to allow the expiration time 314 to increase. If the user responds in the affirmative to the message, then the determination at block 440 is true, and the user allows the expiration time to increase, so control continues to block 430, as previously described above.

If the user responds in the negative to the message, then the determination at block 440 is false, and the user does not allow the expiration time 314 to increase, so control continues to block 445 where the first virtual machine 150 calculates estimated times for all other virtual machines, at the same or different computers, to complete the task. The first virtual machine 150 calculates the estimated times using the respective resources that are currently allocated to other virtual machines, as previously described above. For all virtual machines with estimated times before their respective expiration times, the first virtual machine 150 selects a selected virtual machine with the smallest estimated time if such a selected virtual machine exists. Control then continues to block 505 of FIG. 5 where the first virtual machine 150 determines whether a selected virtual machine was found by the logic of block 445.

If the determination at block 505 is true, then a selected virtual machine exists with an estimated time that is before its expiration time 314, and the estimated time of the selected virtual machine is the smallest estimated time of all virtual machines, so control continues to block 510 where the first virtual machine 150 sends the request 156 to perform the task to the selected virtual machine, and the first virtual machine 150 halts the performance of the task. The selected virtual machine receives and performs the task, as described in FIGS. 4 and 5 (the selected virtual machine, and all virtual machines, execute their respective copy or instance of the logic of FIGS. 4 and 5). Control returns to block 410 of FIG. 4, as previously described above.

If the determination at block 505 is false, then a selected virtual machine does not exist with an estimated time that is before its expiration time 314, so control continues to block 515 where the first virtual machine 150 requests the hypervisor 154 to allocate resources (e.g., processor and/or memory) that will allow the first virtual machine 150 to complete the task complete before the expiration time of the first virtual machine 150. In an embodiment, the first virtual machine 150 calculates the amount of resources to allocate by searching the history log 158 and finding a previous request that requested a previous task identical to the current task with an actual completion time that, when added to the current time, is less than the expiration time, and selecting the amount of resources assigned to that previous task. In another embodiment, the first virtual machine 150 finds a previous task that is similar to the current task. In various embodiments, the current task and the previous task are similar if they execute or specify queries that specify an access of the same database table (or the same table and the same where clause), but specify the selection of different columns of the tables, if the two tasks query the same columns but specify different key values, if the two tasks specify identical query commands but different host variable or parameter marker values, if the two tasks specify a join over the same table on the same join columns but specify different where clauses, group by clauses, or select lists, if the current task specifies a query that produces rows in a current result set that are a subset of the rows in the previous result set produced by the previous query specified by the previous task, or if the current task and the previous task are of the same type, e.g., both are print jobs. Control then continues to block 520 where the first virtual machine 150 determines whether the hypervisor 154 successfully granted the allocation request. In various embodiments, the hypervisor 154 may deny the allocation request (the allocation request is unsuccessful) if not enough resources are available to meet the allocation request or if higher priority virtual machines have requested the resources.

If the determination at block 520 is true, then the hypervisor 154 granted the resource request, so control continues to block 525 where the first virtual machine 150 performs the task. Control then returns to block 410 of FIG. 4, as previously described above.

If the determination at block 520 is false, then the hypervisor 154 denied the resource allocation request, so control continues to block 530 where the first virtual machine 150 performs the task until the expiration time 314 of the first virtual machine 150. In response the current time exceeding the expiration time 314, the first virtual machine 150 saves progress of performance of the task to the memory 102 and then terminates the first virtual machine 150, shuts down the first virtual machine 150, stops the performing of the task by the first virtual machine 150, and halts execution of the first virtual machine 150. In response to the first virtual machine 150 halting, the hypervisor 154 deallocates resources from the first virtual machine 150. Control then continues to block 599 where the logic of FIG. 5 returns.

Referring again to FIG. 4, if the determination at block 420 is false, then the estimated time is less than or equal to the expiration time 314 specified in the virtual machine data entry whose virtual machine identifier field 312 matches the identifier of the first virtual machine 150 minus the current time, so control continues to block 435 where the first virtual machine 150 performs the requested task. Control then returns to block 410, where the first virtual machine 150 receives the same or a different request 156 to perform the same or a different task from the same or a different client computer 132.

In this way, tasks may be completed even though the execution of virtual machines automatically expire.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer-readable storage medium encoded with instructions, wherein the instructions when executed comprise:
    if an estimated time to perform a task by a first virtual machine is less than or equal to an expiration time of the first virtual machine minus a current time, performing the task by the first virtual machine; and
    if the estimated time to perform the task by the first virtual machine is greater than the expiration time of the first virtual machine minus the current time and an extension of the expiration time of the first virtual machine is allowed, changing the expiration time of the first virtual machine.

2. The computer-readable storage medium of claim 1, further comprising:
    if the estimated time to perform the task by the first virtual machine is greater than the expiration time of the first virtual machine minus the current time and the extension of the expiration time of the first virtual machine is not allowed, selecting a selected virtual machine from among a plurality of virtual machines with a smallest estimated time to perform the task.

3. The computer-readable storage medium of claim 2, further comprising:
    sending a request to perform the task to the selected virtual machine if the smallest estimated time to perform that task is before an expiration time of the selected virtual machine.

4. The computer-readable storage medium of claim 3, further comprising
    if the smallest estimated time to perform that task is not before the expiration time of the selected virtual machine, requesting that resources be allocated to the first virtual machine that allow the first virtual machine to complete the task before the expiration time of the first virtual machine.

5. The computer-readable storage medium of claim 4, further comprising
    if the requesting that the resources be allocated to the first virtual machine is unsuccessful, performing the task until the expiration time of the first virtual machine, saving progress of the task, and terminating the first virtual machine after the expiration time of the first virtual machine.

6. The computer-readable storage medium of claim 5, further comprising:
calculating an amount of the resources to be allocated to the first virtual machine that allow the first virtual machine to complete the task before the expiration time of the first virtual machine based on a history of allocated resources and tasks.

7. The computer-readable storage medium of claim 1, further comprising:
calculating the estimated time to be proportional to cardinality of rows in database tables specified by the task.

8. A computer comprising:
a processor; and
memory communicatively connected to the processor, wherein the memory is encoded with instructions, and wherein the instructions when executed by the processor comprise if an estimated time to perform a task by a first virtual machine is less than or equal to an expiration time of the first virtual machine minus a current time, performing the task by the first virtual machine,
if the estimated time to perform the task by the first virtual machine is greater than the expiration time of the first virtual machine minus the current time, selecting a selected virtual machine from among a plurality of virtual machines with a smallest estimated time to perform the task and sending a request to perform the task to the selected virtual machine, and
if the smallest estimated time to perform that task is not before the expiration time of the selected virtual machine, requesting that resources be allocated to the first virtual machine that allow the first virtual machine to complete the task before the expiration time of the first virtual machine.

9. The computer of claim 8, wherein the sending further comprises:
sending the request to perform the task to the selected virtual machine if the smallest estimated time to perform that task is before an expiration time of the selected virtual machine.

10. The computer of claim 8, wherein the instructions further comprise:
if the requesting that the resources be allocated to the first virtual machine is unsuccessful, performing the task until the expiration time of the first virtual machine, saving progress of the task, and terminating the first virtual machine after the expiration time of the first virtual machine.

11. The computer of claim 10, wherein the instructions further comprise:
calculating an amount of the resources to be allocated to the first virtual machine that allow the first virtual machine to complete the task before the expiration time of the first virtual machine based on a history of allocated resources and tasks.

12. The computer of claim 8, wherein the instructions further comprise:
if the estimated time to perform the task by the first virtual machine is greater than the expiration time of the first virtual machine minus the current time and an extension of the expiration time of the first virtual machine is allowed, changing the expiration time of the first virtual machine.

13. The computer of claim 8, wherein the instructions further comprise:
calculating the estimated time to be proportional to cardinality of rows in database tables specified by the task.

* * * * *